(12) United States Patent
Nitschke et al.

(10) Patent No.: US 11,111,169 B2
(45) Date of Patent: *Sep. 7, 2021

(54) MOLD SHUTTLE POSITIONING SYSTEM FOR A GLASS SHEET FORMING SYSTEM

(71) Applicant: GLASSTECH, INC., Perrysburg, OH (US)

(72) Inventors: David B. Nitschke, Perrysburg, OH (US); Chad E. Cox, Whitehouse, OH (US); Dean M. Nitschke, Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 587 days.

This patent is subject to a terminal disclaimer.

(21) Appl. No.: 15/773,064

(22) PCT Filed: Nov. 2, 2016

(86) PCT No.: PCT/US2016/060059
§ 371 (c)(1),
(2) Date: May 2, 2018

(87) PCT Pub. No.: WO2017/079251
PCT Pub. Date: May 11, 2017

(65) Prior Publication Data
US 2018/0339928 A1   Nov. 29, 2018

Related U.S. Application Data

(60) Provisional application No. 62/249,697, filed on Nov. 2, 2015, provisional application No. 62/249,567, filed on Nov. 2, 2015.

(51) Int. Cl.
*C03B 23/03* (2006.01)
*C03B 35/14* (2006.01)
(Continued)

(52) U.S. Cl.
CPC .......... *C03B 17/06* (2013.01); *C03B 23/023* (2013.01); *C03B 23/03* (2013.01);
(Continued)

(58) Field of Classification Search
CPC ... C03B 35/14; C03B 35/207; C03B 23/0258; C03B 23/0357; C03B 2205/00; C03B 2205/02
See application file for complete search history.

(56) References Cited

U.S. PATENT DOCUMENTS

| 3,778,244 | A | 12/1973 | Nedelec et al. |
| 3,806,312 | A | 4/1974 | McMaster et al. |

(Continued)

FOREIGN PATENT DOCUMENTS

| BE | 480412 A | 2/1948 |
| CN | 1047665 A | 12/1990 |

(Continued)

OTHER PUBLICATIONS

Extended European Search Report dated Jun. 4, 2019, Application No. 16862845.1-1105/ 3371118, PCT/US2016/060059, Applicant Glasstech, Inc., 12 Pages.

(Continued)

*Primary Examiner* — Lisa L Herring
(74) *Attorney, Agent, or Firm* — Brooks Kushman P.C.

(57) ABSTRACT

A mold shuttle positioning system in a glass sheet forming system includes a mold mounted on a support frame. A shuttle frame including a pair of generally parallel elongate beams for receiving and supporting the mold support frame thereon. At least one support wheel assembly including a wheel and a shuttle guide is mounted in proximity to each of the shuttle beams to position and support each one of the beams as the shuttle frame is moved to position the mold supported thereon at one of multiple desired processing (Continued)

locations. At least one mold guide is mounted on the support surface of one of the beams for receiving and fixing the position of the mold support frame relative to the shuttle frame to align and prevent movement of the mold support frame with respect to the shuttle frame in any direction as the mold support frame is supported thereon.

31 Claims, 9 Drawing Sheets

(51) Int. Cl.
| | |
|---|---|
| C03B 23/023 | (2006.01) |
| C03B 35/20 | (2006.01) |
| C03B 23/035 | (2006.01) |
| C03B 17/06 | (2006.01) |

(52) U.S. Cl.
CPC ........ *C03B 23/0357* (2013.01); *C03B 35/145* (2013.01); *C03B 35/207* (2013.01); *C03B 2225/02* (2013.01)

(56) References Cited

U.S. PATENT DOCUMENTS

| | | | |
|---|---|---|---|
| 3,934,970 | A | 1/1976 | McMaster et al. |
| 3,947,242 | A | 3/1976 | McMaster et al. |
| 3,994,711 | A | 11/1976 | McMaster |
| 4,202,681 | A | 5/1980 | McMaster et al. |
| 4,204,854 | A | 5/1980 | McMaster et al. |
| 4,222,763 | A | 9/1980 | McMaster |
| 4,356,018 | A | 10/1982 | McMaster |
| 4,432,782 | A | 2/1984 | Seymour |
| 4,617,043 | A * | 10/1986 | Reunamaki ........... C03B 35/163 65/114 |
| 4,661,141 | A | 4/1987 | Nitschke et al. |
| 4,883,526 | A | 11/1989 | Enk et al. |
| 5,143,535 | A | 9/1992 | Herrington et al. |
| 5,230,728 | A | 7/1993 | McMaster |
| 5,279,635 | A | 1/1994 | Flaugher et al. |
| 5,330,550 | A | 7/1994 | Kuster et al. |
| 5,336,288 | A | 8/1994 | Carlomagno et al. |
| 5,900,034 | A | 5/1999 | Mumford et al. |
| 5,906,668 | A | 5/1999 | Mumford et al. |
| 5,925,162 | A | 7/1999 | Nischke et al. |
| 5,951,733 | A | 9/1999 | Clark et al. |
| 6,015,512 | A | 1/2000 | Yang et al. |
| 6,173,587 | B1 | 1/2001 | Mumford et al. |
| 6,178,798 | B1 | 1/2001 | Kowalski et al. |
| 6,378,339 | B1 | 4/2002 | Zalesak et al. |
| 6,718,798 | B2 | 4/2004 | Nitschke et al. |
| 6,729,160 | B1 | 5/2004 | Nitschke et al. |
| 7,716,949 | B2 | 5/2010 | Bennett et al. |
| 8,132,428 | B2 | 3/2012 | Vild et al. |
| 9,334,186 | B2 | 5/2016 | King et al. |
| 9,452,948 | B2 | 9/2016 | Nitschke et al. |
| 10,011,514 | B2 | 7/2018 | Nitschke et al. |
| 10,214,440 | B2 | 2/2019 | Nitschke et al. |
| 10,246,364 | B2 | 4/2019 | Nitschke et al. |
| 10,913,678 | B2 | 2/2021 | Nitschke et al. |
| 2002/0009602 | A1* | 1/2002 | Kitayama ........... C03B 11/125 428/432 |
| 2003/0106340 | A1 | 6/2003 | Nitschke et al. |
| 2007/0089459 | A1 | 4/2007 | Vild et al. |
| 2008/0271489 | A1 | 11/2008 | Taplan et al. |
| 2011/0247367 | A1 | 10/2011 | Nitschke et al. |
| 2015/0218029 | A1 | 8/2015 | Nitschke et al. |
| 2018/0312423 | A1 | 11/2018 | Nitschke et al. |

FOREIGN PATENT DOCUMENTS

| | | | |
|---|---|---|---|
| CN | 1289287 | A | 3/2001 |
| CN | 1311761 | A | 9/2001 |
| CN | 1452600 | A | 10/2003 |
| CN | 101291883 | A | 10/2008 |
| CN | 101801865 | A | 8/2010 |
| CN | 103118997 | A | 5/2013 |
| CN | 103987669 | A | 8/2014 |
| EP | 0 668 249 | A2 | 8/1995 |
| EP | 1 348 672 | A2 | 10/2003 |
| JP | S58223626 | A | 12/1983 |
| JP | S58223636 | A | 12/1983 |
| JP | H06502615 | A | 3/1994 |
| JP | 2001524440 | A | 12/2001 |
| JP | 4344085 | B2 | 10/2009 |
| JP | 2017507883 | A | 3/2017 |
| RU | 2 025 468 | C1 | 12/1994 |
| RU | 2081067 | C1 | 6/1997 |
| RU | 2 083 512 | C1 | 7/1997 |
| RU | 2 092 460 | C1 | 10/1997 |
| SU | 795632 | A1 | 1/1981 |
| SU | 844102 | A1 | 7/1981 |
| TW | 201532984 | A | 9/2015 |
| TW | 201538442 | A | 10/2015 |
| WO | 92/01638 | A1 | 2/1992 |
| WO | 99/26890 | A1 | 6/1999 |
| WO | 2007/050297 | A2 | 5/2007 |
| WO | 2015/119752 | A1 | 8/2015 |
| WO | 2017079275 | A1 | 5/2017 |

OTHER PUBLICATIONS

U.S. Notice of Allowance dated Aug. 25, 2020, U.S. Appl. No. 15/772,918, 8 Pages.
Allowed Claims, U.S. Appl. No. 15/772,918, 7 Pages.
U.S. Non-Final Office Action dated Jan. 15, 2020, U.S. Appl. No. 15/772,918, 32 Pages.
Extended European Search Report dated Jul. 18, 2019, Application No. 16862861.8, Applicant Glasstech, Inc., 9 Pages.
Chinese Second Office Action dated Aug. 12, 2019, Application No. 201680063765.7, 5 Pages.
Indian Examination Report dated Aug. 26, 2020, Application No. 201817019805, Applicant Glasstech, Inc., 6 Pages.
Brazilian Preliminary Examination Report dated Mar. 25, 2020 (with English Machine Translation), Application No. BR112018008804-8, Applicant Glasstech, Inc. (9 Pages).
Russian Office Action & Search Report dated Mar. 20, 2020 (with English Machine Translation), Application No. 2018119349/03(030432), Applicant Glasstech, Inc. (13 Pages).
Japanese Search Report dated Sep. 7, 2020 (with English Translation), Application No. 2018-522062, 31 Pages.
Japanese Notice of Allowance dated Nov. 4, 2020 (with English Translation), Application No. 2018-522062, 6 Pages.
Japanese Office Action dated Oct. 30, 2020, (with English Machine Translation), Application No. 2018-522001, 6 Pages.
U.S. Patent and Trademark Office, International Search Report and Written Opinion of International Application No. PCT/US2016/060090, dated Jan. 23, 2017.
U.S. Patent and Trademark Office, International Search Report and Written Opinion of International Application No. PCT/US2016/060059, dated Mar. 31, 2017.
Chinese First Office Action & Search Report dated Jun. 5, 2020, Application No. 201680064115.4, Applicant Glasstech, Inc., 17 Pages.
Brazilian Preliminary Report dated Feb. 27, 2020 (with English Machine Translation), Application No. BR112018008801-3, Applicant Glasstech, Inc. (8 Pages).
Russian Acceptance Decision & Search Report dated Feb. 20, 2020 (with Partial English Translation of Decision & Search Report), Application No. 2018119496/03, Applicant Glasstech, Inc. (19 Pages).
Chinese First Office Action dated Dec. 20, 2018, Application No. 201680063765.7, 5 Pages.
Indian Examination Report dated Sep. 26, 2020, Application No. 201817019803, Applicant Glasstech, Inc., 7 Pages.
Taiwanese Search Report dated Mar. 7, 2021, Application No. 105135359, 2 Pages.

(56) References Cited

OTHER PUBLICATIONS

Taiwanese Search Report dated Mar. 2, 2021, Application No. 105135360, 2 Pages.
Brazilian Examination Report dated Jun. 26, 2021 (with English Machine Translation), Application No. BR112018008801-3, Applicant Glassetch, Inc., 6 Pages.

* cited by examiner

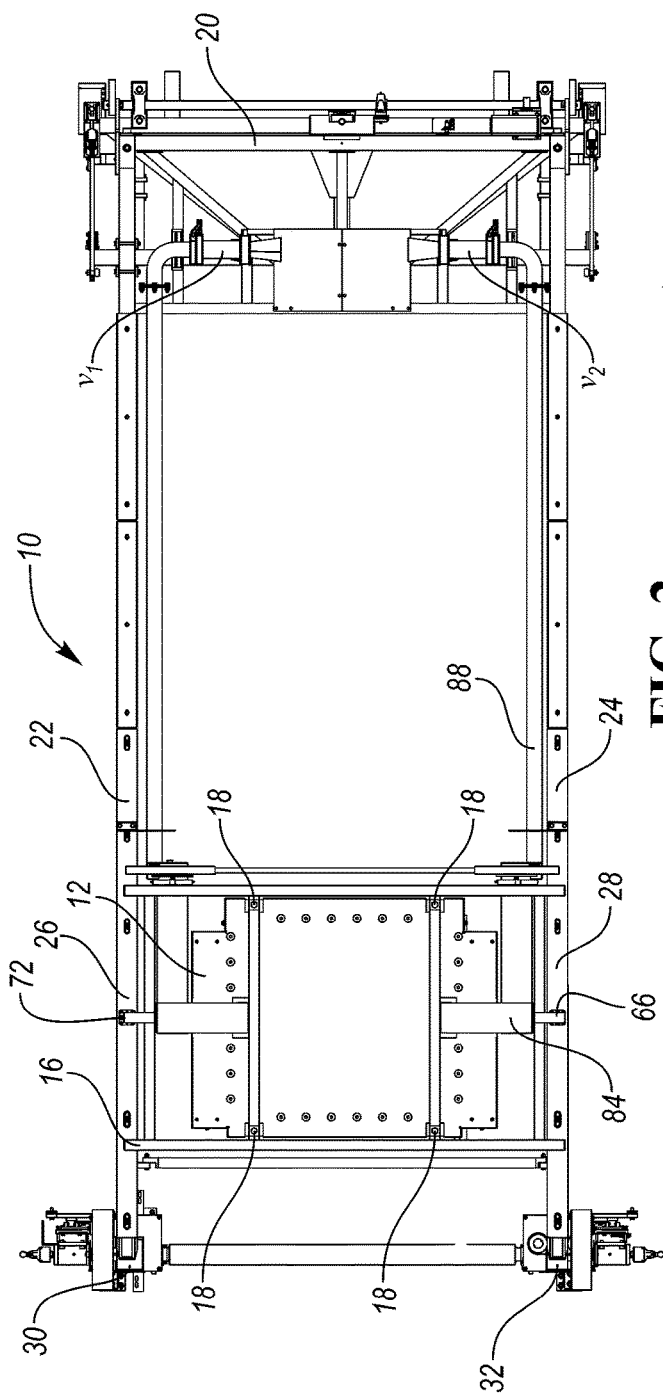
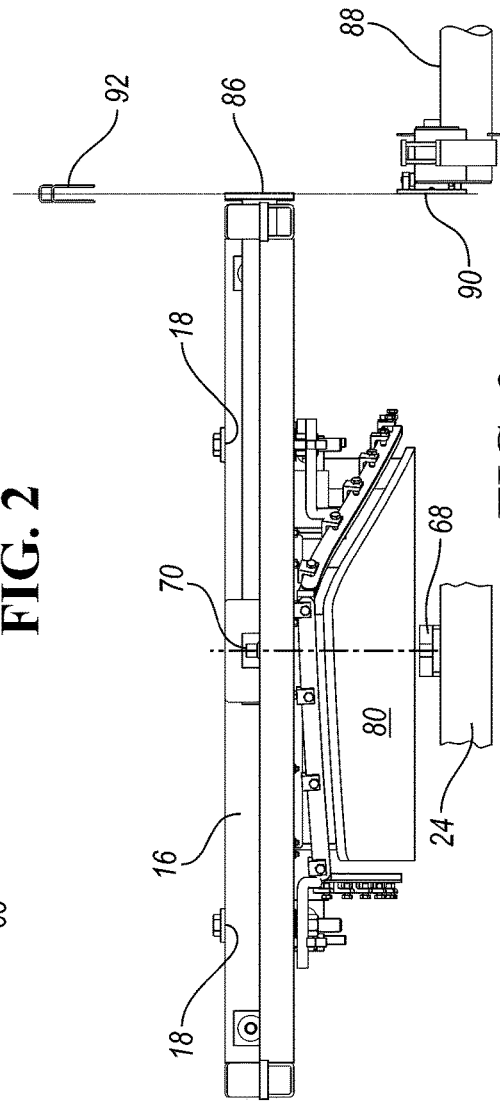
FIG. 2
FIG. 3

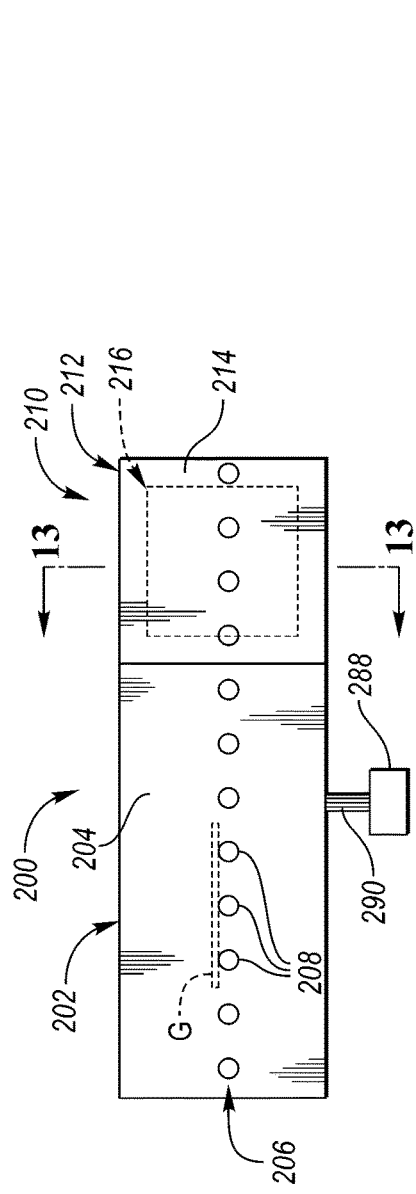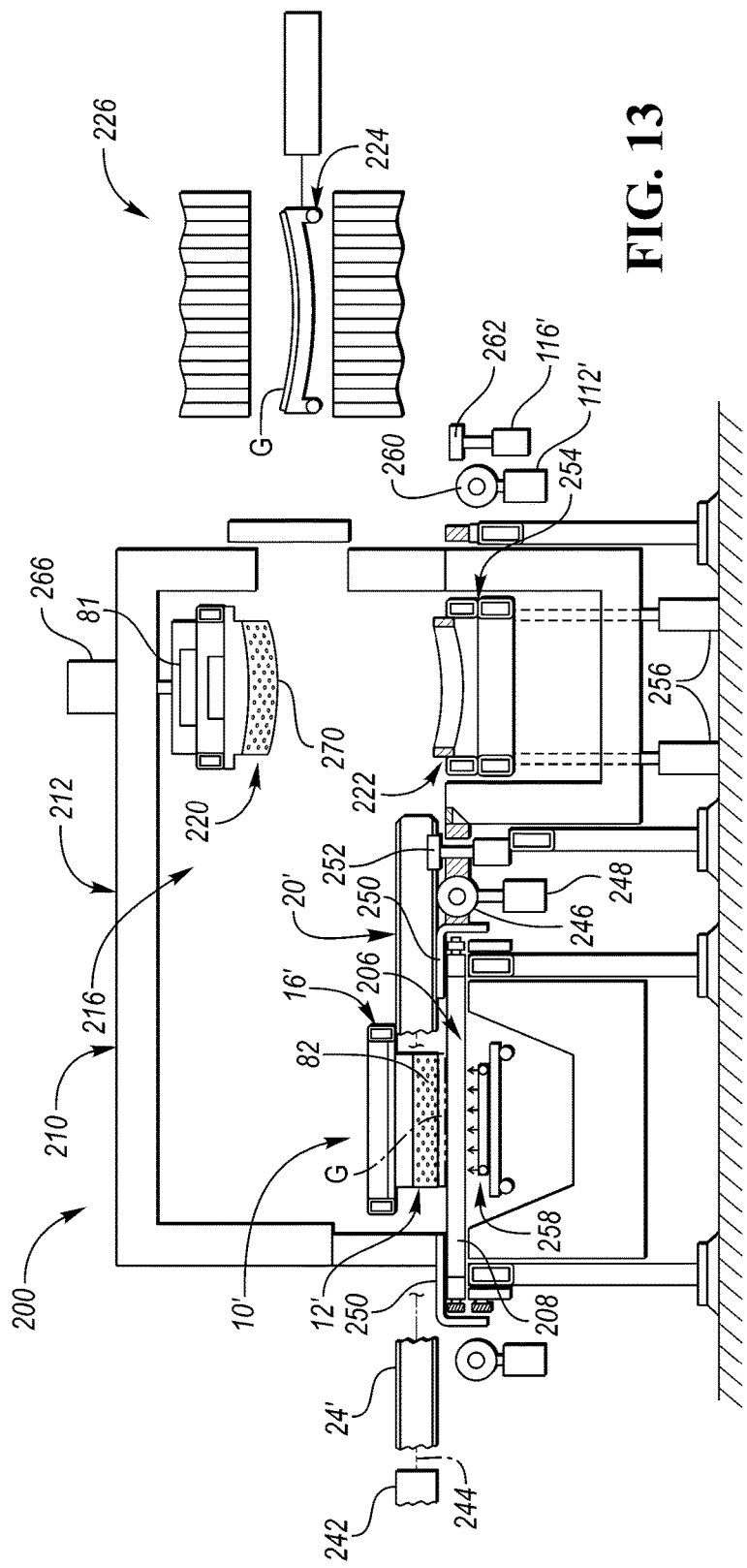

MOLD SHUTTLE POSITIONING SYSTEM FOR A GLASS SHEET FORMING SYSTEM

CROSS-REFERENCE TO RELATED APPLICATION APPLICATIONS

This application is the U.S. national phase of PCT Application No. PCT/US2016/060059, filed on Nov. 2, 2016, which claims the benefit of U.S. provisional application Ser. No. 62/249,697, filed on Nov. 2, 2015 and 62/249,567 filed Nov. 2, 2015, the disclosures of which are incorporated in their entirety by reference herein.

TECHNICAL FIELD

This invention relates to a mold shuttle positioning system and method for forming and transporting a hot glass sheet in a glass sheet bending system.

BACKGROUND

Prior shuttle apparatuses for moving molds in multi-stage glass sheet forming systems are disclosed in U.S. Pat. No. 5,900,034, Mumford et al.; U.S. Pat. No. 5,906,668 Mumford et al.; U.S. Pat. No. 5,925,162 Nitschke et al.; U.S. Pat. No. 6,173,587 Mumford et al.; U.S. Pat. No. 6,718,798 Nitschke et al.; and U.S. Pat. No. 6,729,160 Nitschke et al., for example.

SUMMARY

A mold shuttle positioning system, according to the disclosure, for forming a hot glass sheet in a glass processing system includes a mold having a surface that defines an initial shape to which the glass sheet is to be formed. The mold may include a vacuum chamber connected to a vacuum source, and a set of openings that extend from the mold surface into the vacuum chamber.

The shuttle system also includes a mold support frame including at least one connection surface for mounting the mold thereon.

The shuttle system also includes a shuttle frame including a pair of generally parallel elongate beams, each of the beams including at least one support surface near one end of the beam for receiving and supporting the mold support frame thereon.

At least one mold guide may be mounted on the support surface of one of the beams for receiving and fixing the position of the mold support frame relative to the shuttle frame to prevent movement of the mold support frame with respect to the shuttle frame in any direction as the mold support frame is supported thereon. At least one other mold guide may be provided, which guide is mounted on the support surface of the other one of the beams for receiving and fixing the position of the mold support frame relative to the shuttle frame to prevent movement of the mold support frame in a first direction with respect to the shuttle frame, but allow movement of the mold support frame in a second direction with respect to the shuttle frame as the mold support frame is supported thereon.

At least one support wheel assembly is mounted in proximity to each of the shuttle beams to position and support each one of the beams as the shuttle frame is moved to position the mold supported thereon at one of multiple desired processing locations. Each support wheel assembly includes a support wheel, and may also include an actuator for selectively moving the support wheel and the beam supported thereon in a generally vertical direction. The shuttle frame also includes a drive assembly which moves the supported shuttle beams on the support wheel(s) in a generally lateral direction, At least one shuttle guide may be mounted on at least one of the support wheel assemblies associated with only one of the beams to locate and prevent movement of the associated shuttle beam in a first lateral direction with respect to the heating and forming system, but allow movement of the shuttle in a second lateral direction with respect to the heating and forming system as the shuttle and mold are positioned for processing the glass sheet in multiple locations within the heating and forming system.

According to another aspect of the disclosure, at least one alignment wheel assembly may be mounted to position each one of the beams as the shuttle frame is moved to position the mold at one of multiple desired locations, the alignment wheel assembly including an alignment wheel for vertically aligning the beam as the shuttle is positioned. At least one alignment guide may be mounted on at least one of the alignment wheel assemblies associated with only one of the beams for receiving and laterally aligning the associated shuttle beam relative to a selected point on the heating and forming system to locate and prevent movement of the shuttle in a first lateral direction with respect to the heating and forming system, but allow movement of the shuttle in a second lateral direction with respect to the heating and forming system as the shuttle and mold are positioned for processing the glass sheet in multiple locations within the heating and forming system.

According to another aspect of the disclosure, the mold includes a full downwardly facing surface and a vacuum chamber having a set of openings that extend from the surface into the vacuum chamber, and the mold support frame includes at least one mold conduit operably connected at a first location to the vacuum chamber and including an opening at a second location defining a first coupling port. At least one vacuum source may be mounted on the shuttle frame near the end of the beam opposite the end including the mold support frame support surface. At least one shuttle conduit may be operably connected at a first location to the vacuum source and include an opening at a second location defining a second coupling port. A connector may be provided for releasably connecting a first coupling port to a second coupling port to provide communication of the vacuum from the vacuum source through the shuttle conduit and through the mold conduit to the vacuum chamber for selectively drawing a vacuum at the downwardly facing surface of the mold.

According to another aspect of the disclosure, a mold shuttle positioning system including one or more of the above-described aspects of the disclosure is provided for use in a three stage forming station for forming a hot glass sheet, wherein the mold shuttle positioning system includes a first upper vacuum mold having a full downwardly facing surface that defines an initial shape. The three stage forming station includes an upwardly facing lower mold which receives the glass sheet from the first upper mold so the glass sheet sags under gravity. A downwardly facing second upper mold of the forming station is complementary to the upwardly facing lower mold and cooperates with the lower mold to form the glass sheet with curvature corresponding to the shapes of the lower mold and the second upper mold.

According to another aspect of the disclosure, the three stage forming station also includes a conveyor from which the first upper mold receives the glass sheet prior to the shuttle including the first upper mold being moved laterally to move the glass sheet above the lower mold, which lower mold then receives the glass sheet for subsequently performing further forming with the second upper mold. This disclosed embodiment also includes a housing having a heated chamber, and has the conveyor embodied by a roll conveyor for conveying the hot glass sheet into the heated chamber of the housing along a horizontal plane of conveyance. The shuttle is movable laterally within the heated chamber to position the first upper mold between a pickup position above the roll conveyor and a delivery position spaced laterally from the pickup position. A gas lift jet array may be located below the plane of conveyance to supply upwardly directed gas jets for lifting the glass sheet upwardly from the roll conveyor to the first upper mold when located in its pickup position to initially form and support the glass sheet against the downwardly facing surface of the first upper mold.

The second upper mold is spaced laterally within the heated chamber from the pickup position of the first upper mold and is movable vertically between an upper position located above the elevation of the plane of conveyance and a lower position closer to the elevation of the plane of conveyance, and the second upper mold has a downwardly facing surface of a downwardly convex shape that further defines the desired curvature of the glass sheet.

A second vacuum source may be provided to selectively draw a vacuum at the downwardly facing surface of the second upper mold. The lower mold is located within the heated chamber below the second upper mold and is also below the first upper mold after movement of the shuttle and first upper mold to its delivery position with the glass sheet supported thereon by vacuum drawn by the shuttle vacuum source. The shuttle vacuum may then be terminated to release the glass sheet onto the lower mold, and the shuttle operated to move the first upper mold back to its pickup position.

The second upper mold is then moved downwardly from its upper position to its lower position to cooperate with the lower mold to further press form the glass sheet, and the second upper mold is subsequently moved upwardly to its upper position with the formed glass sheet supported on the second upper mold by vacuum drawn at its downwardly facing surface by a vacuum source associated with the second upper mold.

A delivery mold is moved to below the formed glass sheet on the second upper mold in its upper position whereupon the vacuum is terminated and the glass sheet is released from the second upper mold onto the delivery mold which is then moved out of the forming station for delivery of the formed glass sheet. One or more controllers may be utilized to operate the heating chamber, the roll conveyor, the shuttle system including the first upper mold, the gas lift jet array, the second upper mold, the vacuum source, the lower mold, and the delivery mold to perform the forming of the glass sheet and its delivery.

In one disclosed embodiment, a first support wheel assembly including a shuttle guide and a first alignment wheel assembly including an alignment guide, are each mounted to receive one of the shuttle beams at a fixed position with respect to the conveyor (e.g., at a relatively upstream location), while a second support wheel assembly and a second alignment wheel assembly (each without a shuttle guide or an alignment guide) are each mounted to receive the other shuttle beam at another fixed position with respect to the conveyor (e.g., at a relatively downstream location). This arrangement thereby ensures that the shuttle is registered at a fixed selected (e.g., the upstream) location as it is positioned and repositioned between a pickup position above the roll conveyor and a delivery position in the forming station spaced laterally from the pickup position, while the second support wheel assembly and second alignment wheel assembly support and vertically align the other shuttle beam as it is positioned but do not fix this beam in an upstream/downstream location, thereby allowing for some movement of this shuttle beam as a result of thermal expansion/contraction of the shuttle.

In another aspect of the disclosed embodiment, the mold guide for receiving and fixing the position of the mold support frame relative to the shuttle frame to prevent movement of the mold support frame with respect to the shuttle frame in any direction is mounted on the same shuttle beam as the first support wheel assembly and the first alignment wheel assembly, to thereby ensure that the mold is similarly registered at a fixed selected location with respect to the mold shuttle (and, thereby, the conveyor (e.g., upstream), while a second mold guide is mounted on the support surface of the other (e.g., downstream) shuttle beam for receiving and fixing the position of the mold support frame relative to the shuttle frame to prevent movement of the mold support frame in a first direction with respect to the shuttle frame (e.g., along the length of the shuttle beam), but allow movement of the mold support frame in a second direction (e.g., upstream/downstream), thereby similarly allowing for some movement of the mold and mold frame relative to this shuttle beam as a result of thermal expansion/contraction.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 2 is a partial top view of FIG. 1.

FIG. 3 is a partial side view of the mold, mold support frame, and vacuum conduit showing the first and second coupling ports disconnected and displaced vertically.

FIG. 12 is a schematic elevational view of a glass sheet processing system including a three stage forming station that may employ the disclosed vacuum mold shuttle system for three stage forming of a hot glass sheet.

FIG. 13 is a sectional view taken through the forming station along the direction of line 13-13 in FIG. 12 illustrating one embodiment of the three stage forming station of the invention that includes first and second upper molds, a lower mold and a delivery mold for performing three stage forming of a hot glass sheet with compound curvature.

DETAILED DESCRIPTION

As required, a detailed embodiment of the present invention is disclosed herein. However, it is to be understood that the disclosed embodiment is merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to practice the present invention.

Figure 1:
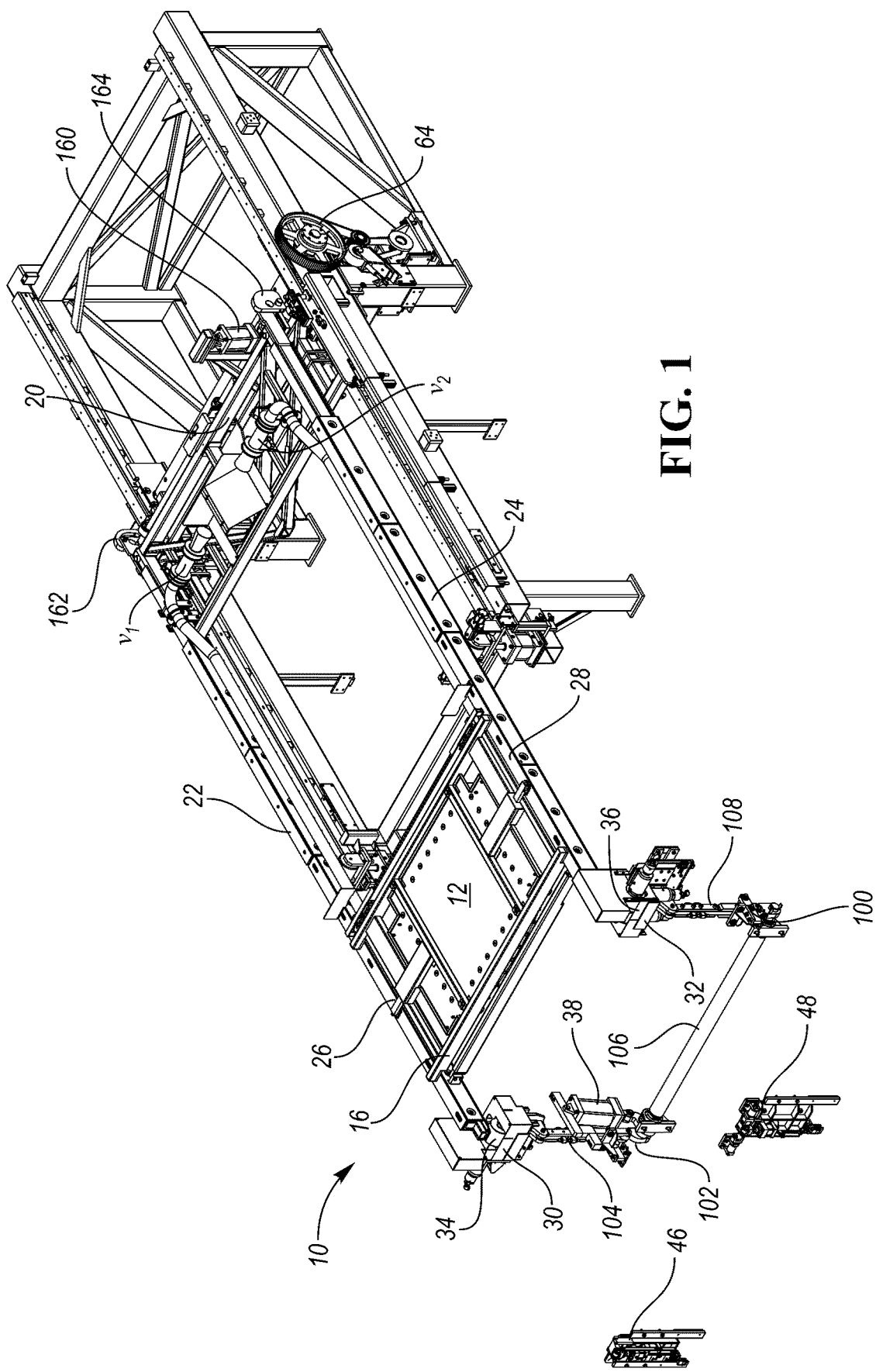
FIG. 1 is a perspective view of an embodiment of a mold shuttle positioning system according to the disclosure.

Referring to FIGS. 1-3, a mold shuttle positioning system, generally designated as 10, for use in forming a hot glass sheet in a glass processing system includes a mold 12 having a surface that defines the initial shape to which the glass sheet is to be formed. The mold may include a vacuum chamber connected to at least one vacuum source (two of which are shown in Figure 1as $v_1$ and $v_2$), and a set of openings (shown as 82 in FIG. 13) that extend from the mold surface into the vacuum chamber.

The shuttle system also includes a mold support frame 16 including at least one connection surface 18 for mounting the mold 12 thereon. The shuttle system 10 also includes a shuttle frame 20 including a pair of generally parallel elongate beams 22, 24, each of the beams 22, 24 including at least one support surface 26, 28 near one end of the beam for receiving and supporting the mold support frame 16 thereon.

Referring now to FIGS. 1, 2, 6, 7, 10 and 11, the shuttle system 10 also includes at least one support wheel assembly (two are shown as 30 and 32) mounted in proximity to each one of the shuttle beams 22, 24 to position and support each one of the beams 22, 24 as the shuttle frame 20 is moved horizontally and vertically to position the mold 12 at one of multiple desired processing locations.

Each support wheel assembly 30, 32 includes a support wheel 34, 36 to support beams 22, 24 as the mold shuttle 20 (and each of the beams 22, 24) are moved in a generally horizontal direction. The support wheel assemblies 30, 32 may also include an actuator 38 for selectively moving each of the support wheels 34, 36 and the shuttle beams 22, 24 supported thereon in a generally vertical direction when desired (as described in greater detail hereinafter).

Figure 7:
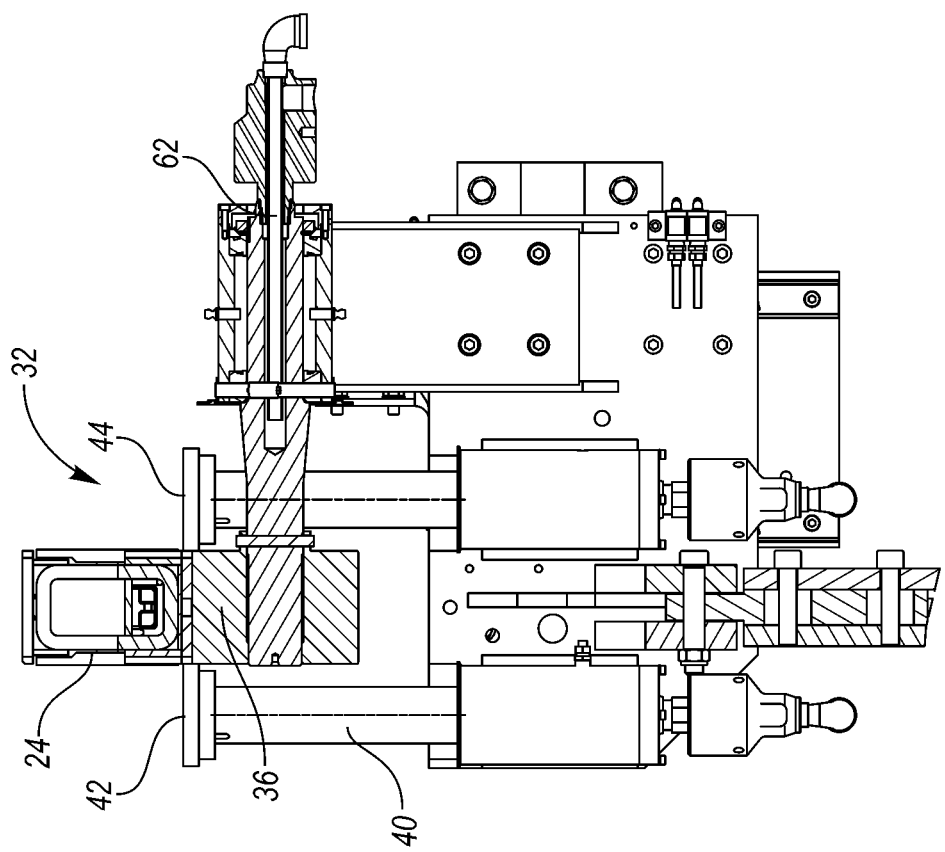
FIG. 7 is an enlarged end view in partial cross-section of another one of the shuttle support wheel assemblies including a shuttle guide mounted to horizontally align the shuttle beam opposite the beam shown in FIG. 6.

Referring to FIG. 7, at least one shuttle guide 40 may be mounted on at least one of the support wheel assemblies 32 associated with only one of the beams 24 for receiving and fixing the position of the shuttle frame 20 relative to the forming station (shown as 210 in FIG. 13) of the heating and forming system (shown as 200 in FIG. 13) to locate and prevent movement of the shuttle frame 20 in a first lateral direction with respect to the heating and forming system 200, but allow movement of the shuttle frame 20 in a second lateral direction with respect to the heating and forming system 200 as the shuttle frame 20 and mold (shown as 12 in FIG. 1, and 12' in FIG. 13) are positioned for processing the glass sheet in multiple locations within the heating and forming system 200. In the disclosed embodiment, shuttle guide 40 includes a pair of rotating guide wheels 42 and 44 mounted on opposite sides of beam 24 to contact the opposing sides of beam 24 and position the beam as it is conveyed atop support wheel 36.

Figure 6:
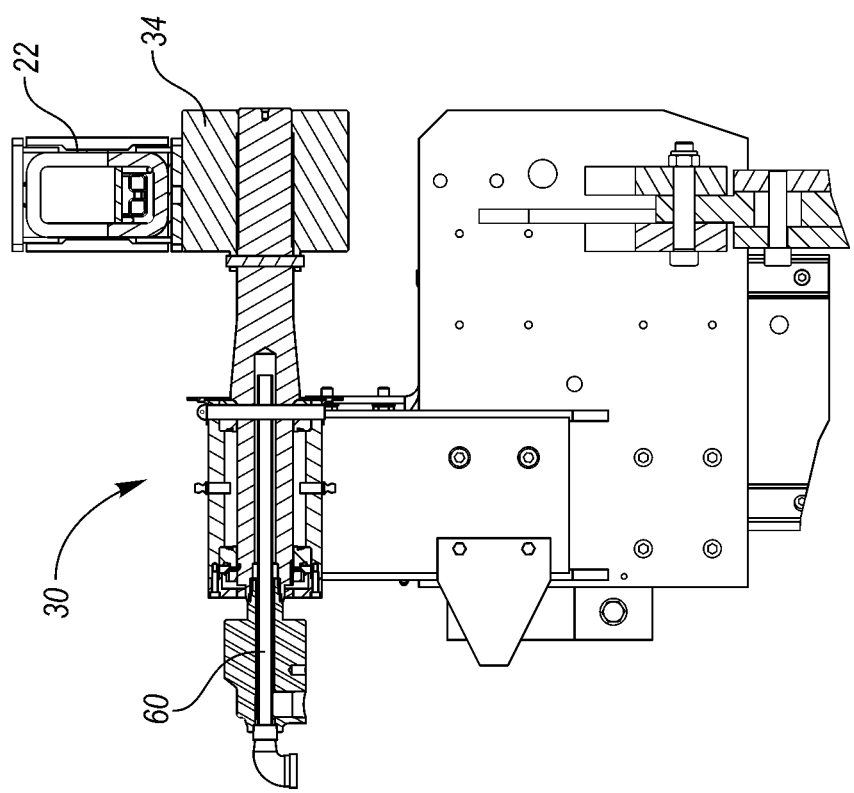
FIG. 6 is an enlarged end view in partial cross-section of one of the shuttle support wheel assemblies mounted to support one of the shuttle beams.

Referring to FIGS. 6 and 7, each of support wheel assemblies 30 and 32 may be provided with cooling channels 60, 62 through which coolant may be circulated to cool any selected support wheel assembly components. Shuttle guide 40 may similarly include cooling channels and coolant for cooling selected components of the shuttle guide.

Figure 8:
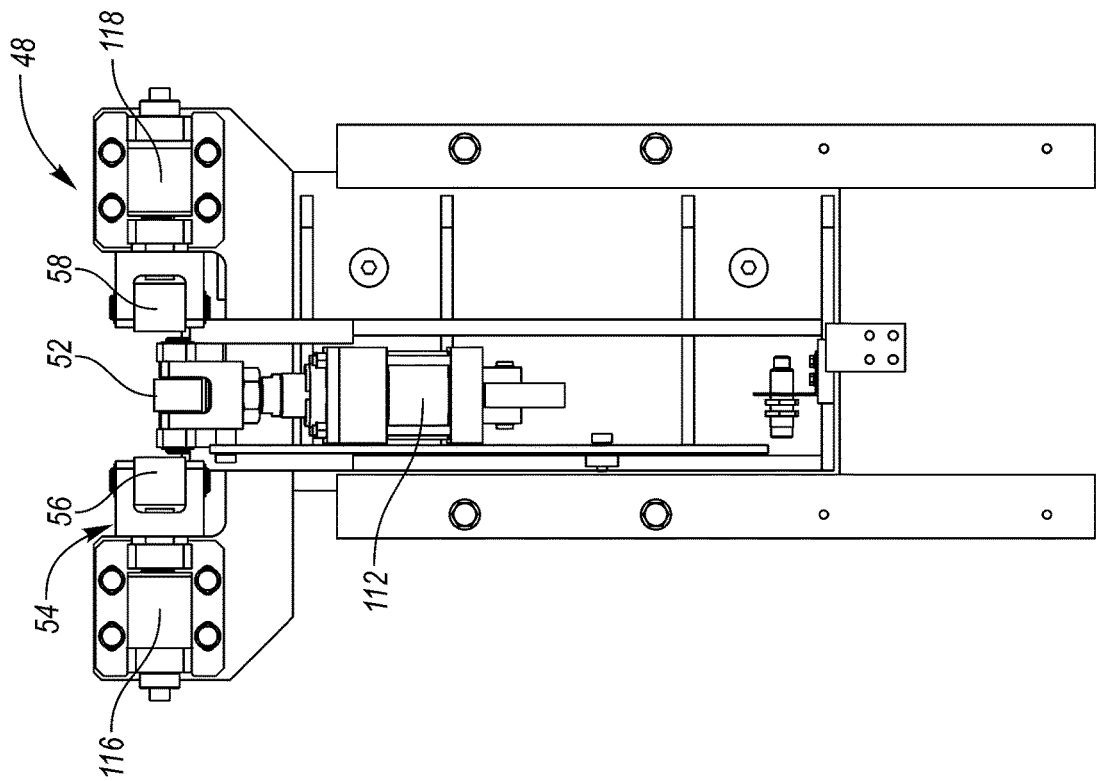
FIG. 8 is an enlarged view of one of the shuttle alignment wheel assemblies including an alignment guide.
Figure 9:
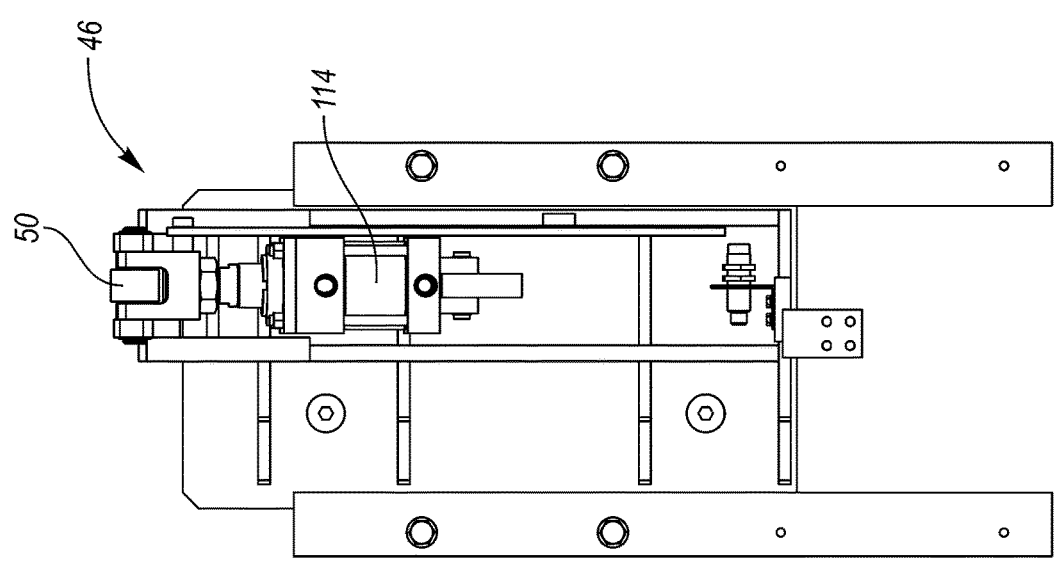
FIG. 9 is an enlarged view of another one of the shuttle alignment wheel assemblies for supporting the beam opposite the beam shown in FIG. 8.

According to another aspect of the disclosure shown in FIGS. 1, 8 and 9, at least one alignment wheel assembly 46, 48 may be mounted to support and vertically position, respectively, each one of beams 22 and 24 as the shuttle frame 20 is moved to position the mold 12 at one of multiple desired locations. The alignment wheel assembly 46, 48 includes an alignment wheel 50, 52 for supporting and positioning, respectively, each of beams 22 and 24. Each alignment wheel assembly 46, 48 may also include an actuator 114, 112, or, alternatively, a spring mechanism, which is operably connected to the alignment wheel 50, 52 to provide some cushioning and vertical positioning as the shuttle beam 22, 24 is moved onto the wheel 50, 52.

Also, as illustrated in FIG. 8, in the disclosed embodiment, at least one alignment guide 54 may be mounted on at least one of the alignment wheel assemblies 48 associated with only one of the beams 24 for receiving and aligning the shuttle frame 20 relative to the heating and forming system 200 to locate and prevent movement of the shuttle frame 20 in a first lateral direction with respect to the heating and forming system 200, but allow movement of the shuttle frame 20 in a second lateral direction (i.e., the direction of travel of the shuttle frame 20) with respect to the heating and forming system 200 as the shuttle frame 20 and mold 12 are positioned for processing the glass sheet in multiple locations within the heating and forming system 200. In the disclosed embodiment, alignment guide 54 includes a pair of rotating guide wheels 56 and 58 mounted on opposite sides of beam 24 to contact the opposing sides of beam 24 as the beam is conveyed atop alignment wheel 52. Again, a cushioning mechanism, such as a spring 116, 118, or, alternatively an air cylinder, may be operably connected to each guide wheel 56, 58 to provide some compliance as the beam 24 contacts the guide wheel 56, 58.

The shuttle frame 20 may be driven by conventional drive system, such as, for example belt-drive system 64, as shown in FIG. 1, to position the shuttle frame 20 at the various desired positions required for the glass forming system with which the shuttle frame 20 is employed. For example, in the disclosed embodiment of FIGS. 12-15, the drive 64 (shown in FIG. 1) may be controlled to position the shuttle frame 20 to and from (1) a fully retracted position where the mold 12, 12' is positioned outside of the heated ambient of the glass sheet forming system, such as, for example, when the mold is being changed, or when the mold and/or shuttle are being maintained or repaired, (2) its initial glass pickup position, shown in FIG. 13, and (3) its final forming station position, shown in FIG. 14. It will be appreciated that other conventional drive systems may be employed to move shuttle frame 20, 20'.

Referring again to FIGS. 1-3, according to another aspect of the disclosure, the mold 12 may include a full downwardly facing surface 80 that defines the initial shape to which the glass sheet is to be formed and a vacuum chamber having a set of openings 82 (shown in FIG. 13) that extend from the surface into the vacuum chamber. The mold support frame 16 includes at least one mold conduit 84 operably connected at a first location to the vacuum chamber and including an opening at a second location defining a first coupling port 86. At least one vacuum source, such as a vacuum generator, shown in FIG. 1 as $v^1$ and/or $v^2$, may be mounted on the shuttle frame 20 near the end of one or both of the beams 22, 24 opposite the end including the mold support frame support surfaces 26 and 28. At least one shuttle conduit 88 may be operably connected at a first location to a vacuum generator and include an opening at a second location defining a second coupling port 90.

A connector 92 may be provided for releasably connecting a first coupling port to a second coupling port to provide communication of the vacuum from the vacuum source through the shuttle conduit and through the mold conduit to the vacuum chamber for selectively drawing a vacuum at the downwardly facing surface of the mold. Additional details of the vacuum mold shuttle assembly including the quick connecting coupling ports may be found in U.S. application Ser. No. 62/249,567, the disclosure of which is incorporated herein in its entirety.

Figure 4:
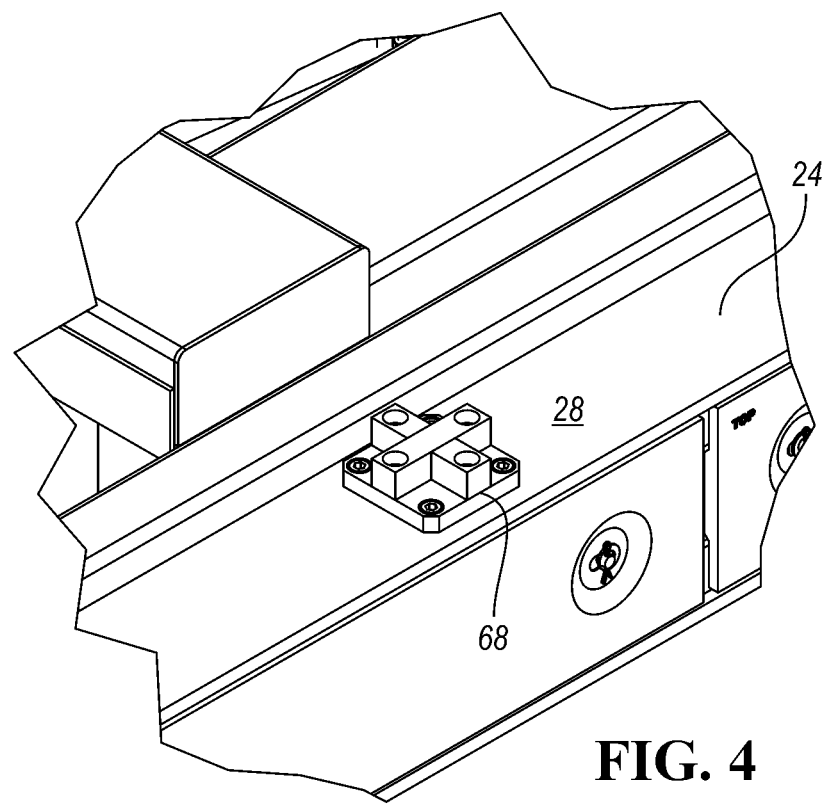
FIG. 4 is a partial perspective view of a support surface on one of the shuttle beams including a mold guide element, with the companion portion of the mold frame removed.
Figure 5:
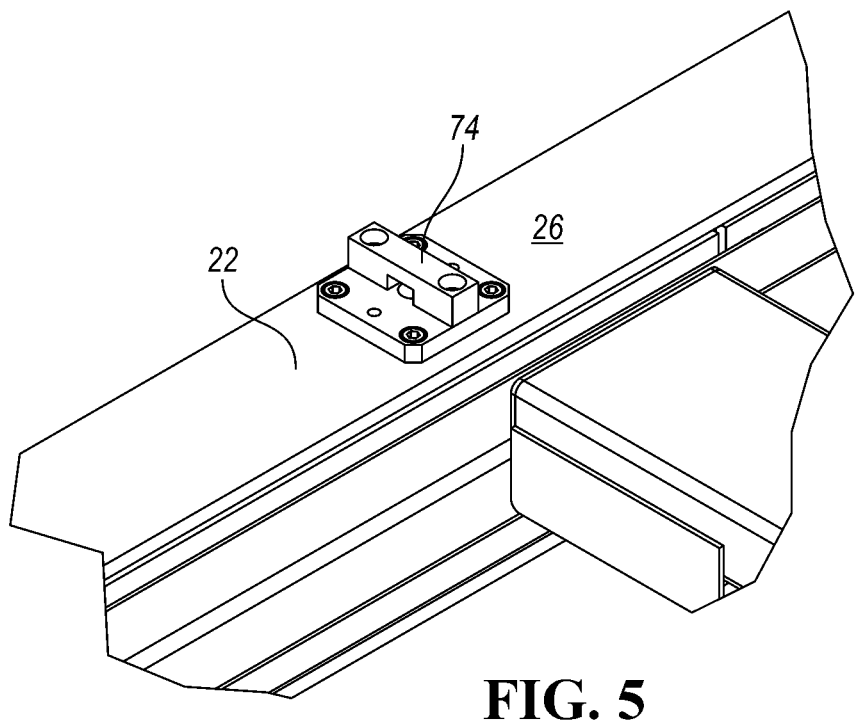
FIG. 5 is a partial perspective view of a support surface on the other of the shuttle beams including another mold guide element, with the companion portion of the mold frame removed.

In the disclosed embodiment of FIGS. 2-4, a first mold guide 66 is mounted on one of the contacting surfaces 28 of one of the beams (shown on beam 24) to receive and fix the position of the mold support frame 16 (and mold 12) relative to the shuttle frame 20 to prevent movement of the mold support frame 16 with respect to the shuttle frame 20 in any direction as the mold support frame is supported thereon. The first guide 66 may include an alignment key 68 which is fixed to extend upwardly from the beam support surface 28 (or, alternatively, project downwardly from the mold frame 16), and a complimentary receiver (or keyway) 70 located on the mold support frame 16 (or, alternatively, on the beam support surface 28) such that, when the mold 12 and mold support frame 16 are installed on the shuttle frame 20, alignment key 68 is received within keyway 70, thereby aligning the mold 12 in a fixed position. In the disclosed embodiment, the mold guide alignment key 68 is shaped as a "+", such that engagement of the correspondingly shaped keyway 70 on the mold frame 16 assures that the mold frame 16 is fixed in position relative to beam 24 at the location of the guide 66. It will be appreciated that key 68 and keyway 70 may alternatively be configured in other complimentary shapes, such as an "X", so long as engagement of key 68 within keyway 70 restricts all movement of the mold frame 16 with respect to beam 24 of the shuttle frame 20 at this location.

Referring to FIGS. 1-3 and 5, a second mold guide 72 (best shown in FIG. 5) may be provided, which mold guide 72 may be mounted on the support surface 26 of the other one of the beams 22 to register the mold frame 16 in the desired location on beam 22. In the disclosed embodiment, the guide 72 associated with beam 22 includes a second key 74 and complimentary shaped keyway which are mounted, respectively, on beam 22 and mold frame 16 (or vice versa) to fix the positioning of mold frame 16 along one axis (such as the length) of the beam 22, but allow for movement of mold frame 16 along another axis (such as the width) of the beam 22 to prevent movement of the mold support frame 16 in a first direction with respect to the shuttle frame 20 (e.g., parallel to the horizontal direction of travel of the shuttle frame 20), but allow movement of the mold support frame 16 in a second direction with respect to the shuttle frame 20 (e.g., transverse to the direction of travel of the shuttle frame 20) as the mold support frame 16 is supported thereon. In the disclosed embodiment, the second key 74 on mold guide 72 is shaped as a "-", and the corresponding keyway is a slot which is suitably sized to accept the key 74 therein, but allow the key to slide in one direction (such as, for example, transverse to the length of the shuttle frame.

By utilizing the first mold guide key 68 and second mold guide key 74 in these described shapes, mold 12 and mold frame 16 are aligned at a fixed position along the length of the shuttle support beams 22, 24 as well as at a fixed position with respect to one of the beams 24, but the mold 12 and mold frame 16 are allowed to move in a direction transverse to beam 22, to align the mold at a fixed point on the shuttle frame 20, but allow for, for example, any thermal expansion or contraction that may result as the mold 12 and mold frame 16 are moved into and out of the heated ambient.

Thus, it should be also appreciated that, in the disclosed embodiment, each of support wheel assembly 32 and alignment wheel assembly 48 includes, respectively, shuttle guide 40 and alignment guide 54 for receiving and maintaining beam 24 of the shuttle frame 20 in a fixed location in a direction transverse to the direction of conveyance of the shuttle (for example, at the upstream side of conveyor 206 shown in FIG. 12), while each of support wheel assembly 30 and alignment wheel assembly 46 do not include guides, thereby allowing for some movement of beam 22 in a direction transverse to the direction of conveyance of the shuttle frame 20 (for example, at the downstream side of conveyor 206) to accommodate thermal expansion/contraction of the shuttle frame 20. In the disclosed embodiment, mold guide 66 similarly restricts movement of mold 12, also with respect to beam 24, while mold guide 72 allows for some movement of the mold support 16 on beam 22 in a direction transverse to the direction of travel of the shuttle frame 20, also to accommodate thermal expansion/contraction of the mold 12 and/or mold support 16 in that direction.

Referring now to FIGS. 12 and 13, the disclosed mold shuttle positioning system 10 (designated as 10' in FIG. 13) may be employed in a glass sheet forming system generally indicated by 200 which includes a furnace 202 having a heating chamber 204 for providing a heated ambient for heating glass sheets. A conveyor 206 of the system conveys the heated glass sheet in a generally horizontally extending orientation and is preferably of the roll conveyor type including rolls 208 like those disclosed by U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al. A three stage forming station 210 of the system 200 is constructed according to the present disclosure and performs the method thereof such that both the forming station and the forming method are described in an integrated manner to facilitate an understanding of different aspects of the disclosure. The forming station 210 has a construction with press forming somewhat similar to that of the disclosure of the aforementioned U.S. Pat. No. 4,661,141 and the other United States Patents set forth in the above Background section of this application. Furthermore, the forming station 210 has an insulated housing 212 defining a heated chamber 214 in which forming apparatus 216 of the forming station is located as best shown in FIG. 13.

Figure 14:
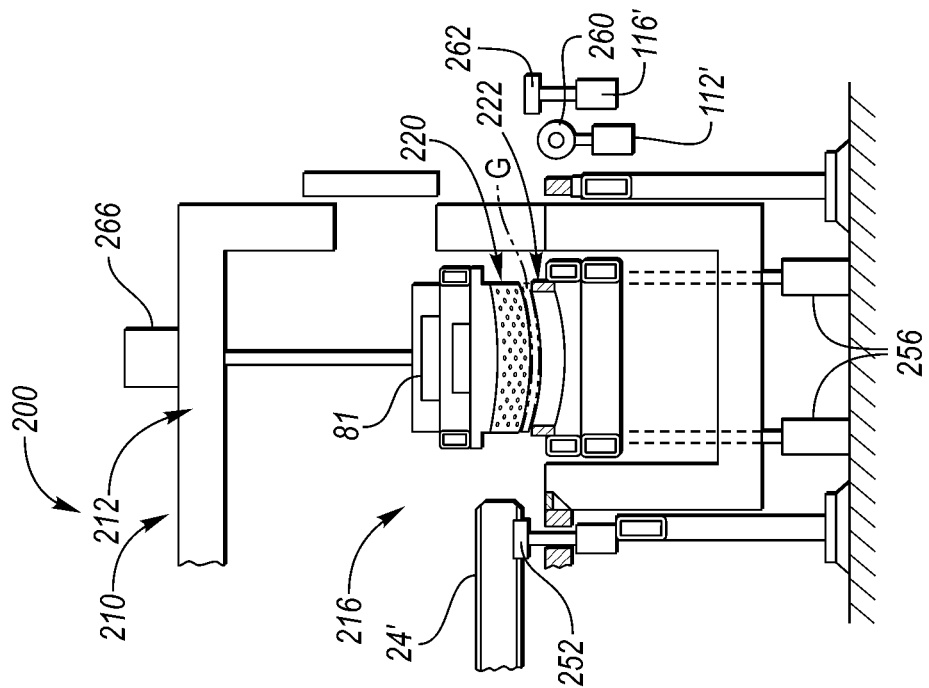
FIGS. 14 and 15 are partial views of FIG. 13 illustrating the glass sheet processing during a cycle of operation of the system.

As illustrated in FIGS. 12-15, the glass sheet forming apparatus 216 may employ the disclosed mold shuttle positioning system 10', including a first upper mold 12' that picks up the softened glass sheet from the heater conveyor 206 during a first stage of the hot glass sheet forming, then moves the glass sheet horizontally to a delivery position shown in FIG. 14 where a lower mold 222 is located, and releases the glass sheet G onto the lower mold 222 for partially forming the glass by gravity sagging. It should be noted that, in this disclosed embodiment, there is a relatively limited time for gravity sagging so that the shape can be more accurately controlled.

Figure 15:
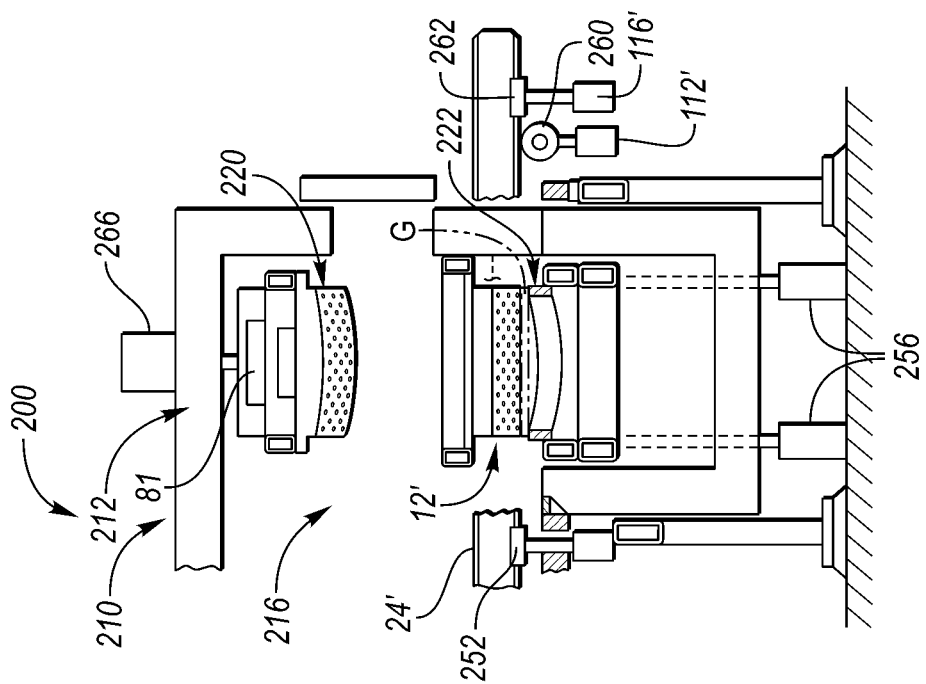

After the glass sheet is deposited on the lower mold 222 by the first upper mold 12', the first upper mold 12' moves back from its delivery position of FIG. 14 to its pickup position of FIG. 13 and the second upper mold 220 moves downwardly as shown in FIG. 15 to cooperate with the lower mold 222 in press forming the glass sheet. Some vacuum forming of the glass on the facing surface 270 of the second upper mold 220 may also be accomplished if desired. After press forming, the second upper mold 220 moves upwardly with the glass sheet supported against its downwardly facing surface 270 by a drawn vacuum and the delivery mold 224 shown in FIG. 13 is moved from a post-forming station (such as, for example, the quench station 226) into the forming station 210 to receive the formed glass sheet for movement out of the forming station 210 (such as to the quench station 226 of the disclosed embodiment) for further processing.

As shown in FIG. 13, in this disclosed embodiment the first upper mold 12' has a support frame 16' that is supported by a shuttle frame 20' including elongated beams 22', 24' (only one shown) that are moved by an actuator 242 through a connection 244 (such as, for example, a suitably controlled drive system 64 as shown in FIG. 1). These beams 22', 24' are supported by associated support rollers 246 that are mounted on an actuator 248 to provide vertical movement of the beams (and hence vertical movement of the first upper mold 12') during its operation. More specifically, the first upper mold 12' can be moved downwardly, for example, to about one half inch (12 to 15 mm) from the conveyor 206 for the initial pickup of the glass sheet and can then be moved upwardly so as to move above covers 250 located above the ends of the conveyor rolls 208. Lateral rollers 252 also contact the beams to provide lateral positioning during movement of the first upper mold 12' between its pickup position shown in FIG. 13 and its delivery position shown in FIG. 14. Additional alignment rollers 260, 262 may be located on the exit side of the forming station 210, as best shown in FIG. 14, to support and position beams 22', 24' when the shuttle frame 20' and mold 12' are moved to the delivery position.

Station 210, illustrated in FIGS. 12-15, thus has three stages of operation wherein the glass sheet may be formed on the first upper mold 12' with curvature in a first direction and straight line elements in a second direction transverse to the first direction, by gravity on the lower mold 222 after receipt thereby from the first upper mold 12' in its delivery position shown in FIG. 14, and finally by the press forming between the second upper mold 220 and the lower mold 222 and/or vacuum forming on the second upper mold 220 as shown in FIG. 15. It will be appreciated that the disclosed mold shuttle positioning system 10 may be employed in other multi-stage forming systems, such as other embodiments of three stage forming systems, which forming systems may include additional details as are disclosed in U.S. Pat. No. 9,452,458 B2, entitled "Three Stage Forming Station And Method For Forming A Hot Glass Sheet With Transverse Curvature", the disclosure of which is incorporated herein in its entirety.

Referring again to FIG. 13, the lower mold 222 as illustrated may be supported by a framework 254 that is supported by actuators 256, such as screw jacks, for vertical movement. This vertical movement can be downward to allow the first upper mold 12' to move over the lower mold 222 and then upward so that the release of the glass sheet is at a more closely spaced relationship to control positioning. In addition, the vertical movement of the lower mold 222 can also be used in cooperation with the vertical movement of the second upper mold 220 to perform the press bending.

A gas lift jet array 258 may be included in the forming station as illustrated in FIG. 13. The gas lift jet array 258 is located below the plane of conveyance C of the hot glass sheet and includes gas jet pumps that supply upwardly directed gas jets for lifting the glass sheet G upwardly from the roll conveyor 206 to initially form and support the glass sheet against the downwardly facing surface 80 (shown in FIG. 3) of the first upper mold 12' which is then positioned above the lower mold as previously described with the glass sheet supported against its downwardly facing surface as shown in FIG. 14. The gas jet pumps may of the type disclosed by U.S. Pat. No. 4,204,854 McMaster et al. and U.S. Pat. No. 4,356,018 McMaster et al. such that a primary gas flow therefrom induces a secondary gas flow many times the extent of the primary gas flow in order to provide the lifting. A downwardly facing surface 80 of the first upper mold 12' also has an array of vacuum holes 82 through which a vacuum may be drawn to also provide initial lifting of the glass sheet and to then support the glass sheet as is herein described. The release of the glass sheet can be provided by the termination of the vacuum drawn, as well as by providing positive pressure gas to the mold surface 80.

It should be appreciated that one embodiment of the gas jet lift array 258 is disclosed in co-pending U.S. patent application Ser. No. 14/929,799, entitled "Lift Device For A Glass Processing System", the disclosure of which is incorporated herein in its entirety.

In one embodiment of the disclosed three stage forming system of FIGS. 12-15, support rollers 246, actuator 248, and lateral rollers 252 may together comprise a first support wheel assembly 32 including a first shuttle guide 40 (of the type shown in FIG. 7) and a first alignment wheel assembly 48 including an alignment guide 54 (of the type shown in FIG. 8) which are each mounted to receive one of the shuttle beams 24' at a fixed position with respect to the conveyor (e.g., at a relatively upstream location). A second support wheel assembly 30 (of the type shown in FIG. 6) and a second alignment wheel assembly 46 (of the type shown in FIG. 9), each without, respectively, a shuttle guide or an alignment guide, are each mounted to receive the other shuttle beam 22' at another fixed position with respect to the conveyor (e.g., at a relatively downstream location). This arrangement thereby ensures that the shuttle is registered at a fixed selected (e.g., the upstream) location as it is positioned and repositioned between a pickup position above the roll conveyor 206 and a delivery position in the forming station spaced laterally from the pickup position, while the second support wheel assembly and second alignment wheel assembly support the other shuttle beam as it is positioned but do not fix this beam in an upstream/downstream location, thereby allowing for some movement of this shuttle beam as a result of thermal expansion/contraction of the shuttle. In this disclosed embodiment, any required vertical movement of the shuttle frame 20 (such as, for example, to move the shuttle frame 20 and mold 12 above covers 250) may be facilitated as shown in FIGS. 1, 10 and 11.

Figure 10:
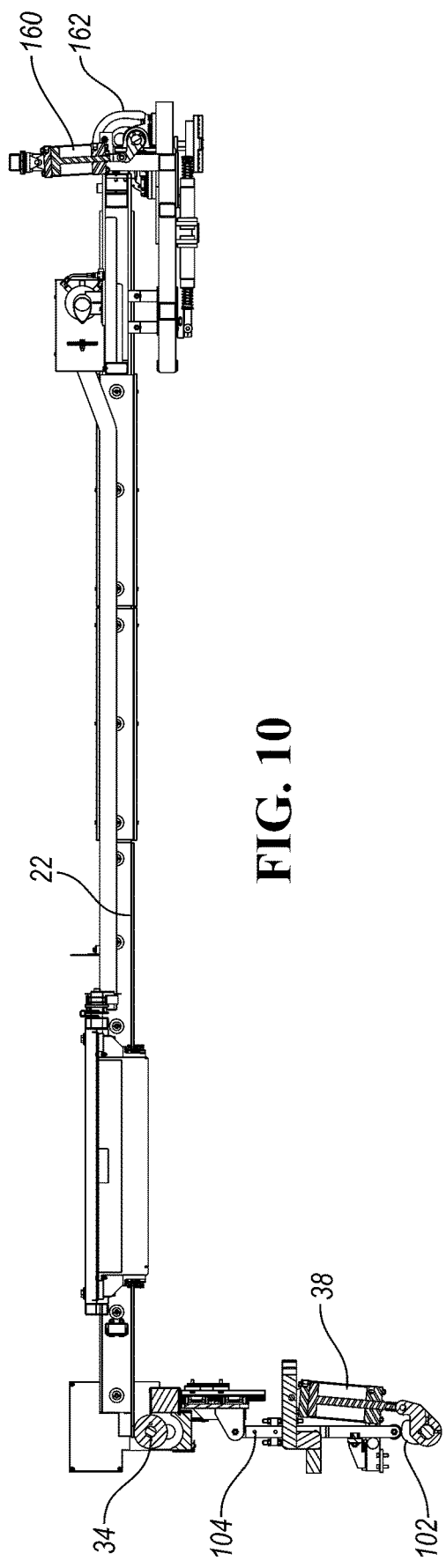
FIG. 10 is a partial side view of the shuttle including sectional views of the rear cam drive assembly, the forward shuttle support wheel assembly, and the shuttle in the raised positions.
Figure 11:
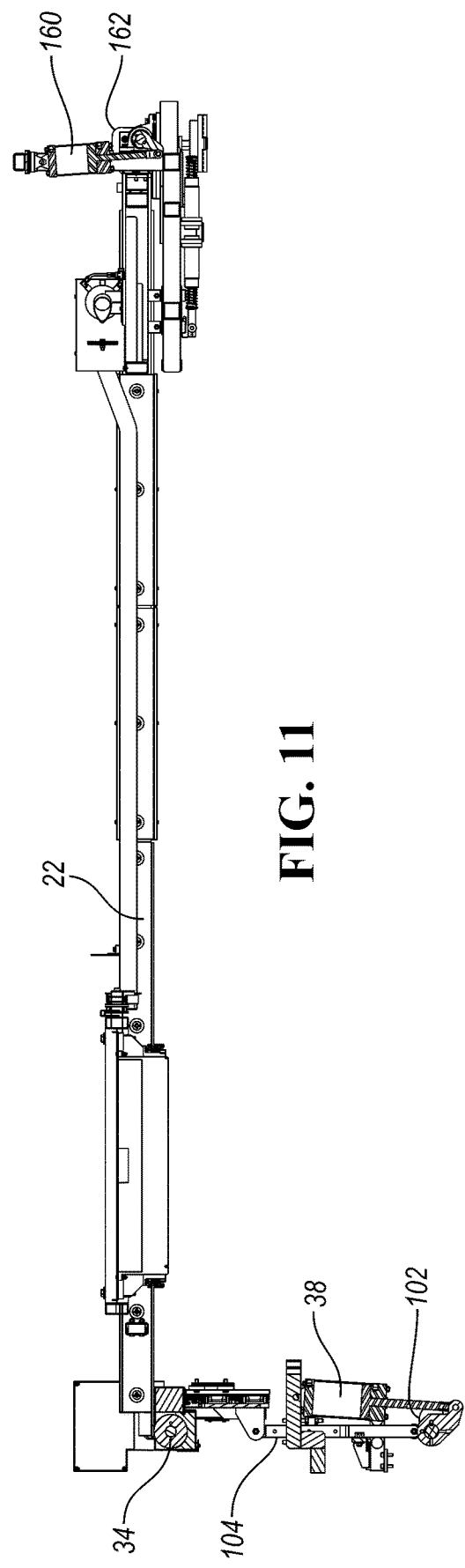
FIG. 11 is a partial side view of the shuttle including sectional views of the rear cam drive assembly, the forward shuttle support wheel assembly, and the shuttle in the lowered positions.

Referring to FIGS. 1, 10 and 11, in this disclosed embodiment, the shuttle frame 20 may be vertically positioned by controlled operation of one or more actuators 38, 160 which are operably connected to lift or lower the frame 20 as desired. In the disclosed embodiment, support wheel assembly 30 further includes actuator 38 which is operably connected to cam 102 which is rotated by the actuator 38 to move one or more linkages 104 to raise or lower support wheel 34. In this disclosed embodiment, actuator 38 is also operably connected to cam 100, via connecting rod 106, to rotate cam 100 and move one or more linkages 108 to raise or lower support wheel 36 in concert with the vertical adjustment of support wheel 34. The opposite end of the shuttle frame 20 includes at least a second lift assembly comprising an actuator 160 which is operably connected to rotate cams 162 and 164 to raise or lower this end of the shuttle frame 20 in concert with the above-described support wheel lift assembly. While, as shown in FIG. 1, a single actuator 38 is operably connected to raise and lower both support wheel assemblies 30 and 32, it will be appreciated that separate actuators may be employed to raise and lower each of support wheel assemblies 30 and 32.

In the raised position depicted in FIG. 10, each of the first and second lift assemblies are operated to raise beams 22, 24. The lowered position of the shuttle frame 20 is depicted in FIG. 11.

Also, in the embodiment of the shuttle frame 20 disclosed in FIGS. 1 and 2 and utilized in a three stage forming system, the mold guide 66 for receiving and fixing the position of the mold support frame 16 relative to the shuttle frame 20 to prevent movement of the mold support frame 16 with respect to the shuttle frame 20 in any direction may be mounted on the same shuttle beam 24, 24' as the first support wheel assembly 32 and the first alignment wheel assembly 48, to thereby ensure that the mold is similarly registered at a fixed selected location with respect to the mold shuttle (and, thereby, the conveyor (e.g., upstream). Similarly, a second mold guide 72 may be mounted on the support surface of the other (e.g., downstream) shuttle beam 22, 22' for receiving and fixing the position of the mold support frame relative to the shuttle frame to prevent movement of the mold support frame in a first direction with respect to the shuttle frame (e.g., along the length of the shuttle beam), but allow movement of the mold support frame 16 in a second direction (e.g., upstream/downstream) thereby similarly allowing for some movement of the mold 12 and mold frame 16 relative to this shuttle beam as a result of thermal expansion/contraction.

The system 200 may further include a controller or control unit 288, shown in FIG. 12, for controlling operation of the above components. The control unit 288 may have a bundle of connections 290 for connecting with the various components of the system 200, such as the vacuum sources 36, 37 and the vacuum shuttle system drives 64, 242, the vertical actuators 38, 160, 112, 116, 248 for the mold shuttle positioning system 10, 10', the heater 204, the roller conveyor system 206, the second upper mold 220, the lower mold 222, the delivery mold 224, and the quench station 226. Furthermore, the control unit 288 may include any suitable hardware and/or software for controlling operation of the above components in order to perform the press forming of the glass sheet G, as well as its delivery and quenching (e.g., for performing the particular algorithms represented by the functions described herein). For example, the control unit 288 may include one or more processors in communication with one or more storage devices or memory units, which include computer readable program instructions that are executable by the one or more processors so that the control unit 288 may control operation of the vacuum mold shuttle 10, as well as the other above-described components of the glass sheet forming system.

The control unit 288 may also, or instead, include one or more application specific integrated circuits, programmable gate arrays, programmable logic devices, and/or digital signal processors. In lieu of the connections 290, the control unit 288 may instead be connected wirelessly to one or more of the above components. Furthermore, the control unit of the mold shuttle positioning system 10 may be part of the control unit 288, or it may be separate from the control unit 288 but configured to communicate with the control unit 288.

During development of the forming station 210, the inventors have determined that glass sheet forming with compound curvature (i.e., curvature about multiple, non-parallel axes) upon initial forming on an upper mold can cause buckling at the central viewing area of the glass sheet due to excess glass at the glass sheet periphery when the flat glass sheet assumes the curvature in crossing directions with no straight line elements, and such buckling results in distorted optics as to transmission and/or reflection in the central viewing area of the glass. It has also been determined that use of a first upper mold with straight line elements during the initial stage of forming, then allowing the gravity sag forming on the lower mold to begin curvature about other axes (e.g., axes transverse to the axes of curvature of the first upper mold), and subsequently performing the final press forming of the glass sheet reduces optical distortions both as to transmission and reflection in the central view area of the formed glass sheet. For purposes of this application, the term "straight line elements" means straight lines between two opposite extremities of the first upper mold surface 80 and of the glass sheet after the first stage of forming, which straight lines have midpoints from which the mold surface and initially formed glass sheet are displaced no more than about 0.5%, and preferably no more than about 0.3%, of the distance between the extremities.

Figure 16:
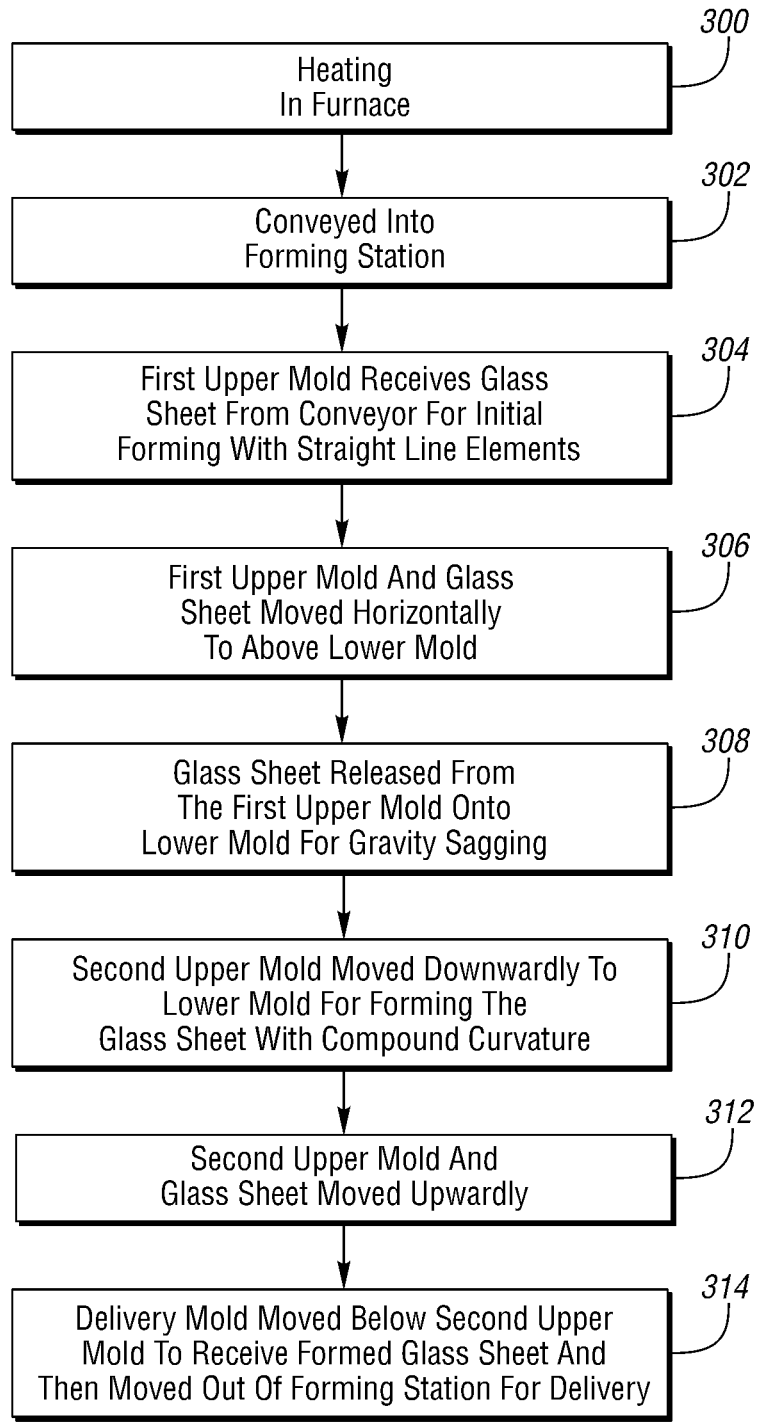
FIG. 16 is a flow chart that illustrates the three stage hot glass sheet forming operation of the forming station embodiment of FIGS. 12-15.

With reference to the flow chart of FIG. 16, the embodiment of FIGS. 12-15 performs the press forming operation beginning, at 300, by the heating of the glass sheet G in the furnace and its subsequent conveyance 302 into the forming station, followed by the first upper mold receiving the glass sheet from the conveyance for initial forming in the first stage 304, and then the horizontal movement 306 of the first upper mold and the glass sheet to above the lower mold. Then, the glass sheet release 308 from the first upper mold onto the lower mold provides gravity sagging in the second stage, and the second upper mold is moved downwardly at 310 to the lower mold for press and/or vacuum forming with compound curvature (including curvature about an axis or axes transverse to the axes of curvature of the first upper mold) in the third stage. The second upper mold and glass sheet are then moved upwardly at 312 followed by the delivery mold movement 314 below the second upper mold to receive the formed glass sheet and then move it out of the forming station for delivery to a post-forming processing station.

The disclosed embodiment of FIGS. 12-15 can have reduced cycle time by the vertical positioning of the constructions disclosed. In this disclosed embodiment, the vertical positioning permits both the first upper mold 12' and the delivery mold 224 to be below the second upper mold 220 at the same time so successive cycles overlap to reduce cycle time.

All of the previously mentioned patents are assigned to the applicant of the present application and are hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mold shuttle positioning system for positioning a hot glass sheet in multiple locations within a glass sheet heating and forming system comprising:
    a mold including a surface that defines a shape to which the glass sheet is to be initially formed;
    a mold support frame including at least one connection surface for mounting the mold thereon;
    a movable shuttle frame that is movable in a generally horizontal direction, the movable shuttle frame including a pair of elongate beams that are generally parallel, each of the elongate beams including a support surface near one end of the elongate beam for receiving and supporting the mold support frame thereon;
    at least one mold guide mounted on the support surface of one of the elongate beams for fixing position of the mold support frame relative to the movable shuttle frame to prevent movement of the mold support frame with respect to the movable shuttle frame in any direction as the mold support frame is supported thereon, and at least one other mold guide mounted on the support surface of an other one of the elongate beams for fixing the position of the mold support frame relative to the movable shuttle frame to prevent movement of the mold support frame in a first direction with respect to the movable shuttle frame, but allow movement of the mold support frame in a second direction with respect to the movable shuttle frame as the mold support frame is supported thereon;
    at least one support wheel assembly mounted to position and support each one of the elongate beams as the movable shuttle frame is moved to position the mold at one of multiple desired processing locations, each support wheel assembly including a support wheel and an actuator for selectively moving the support wheel and the elongate beam supported thereon in a generally vertical direction; and
    at least one shuttle guide mounted on at least one of the support wheel assemblies associated with only one of the elongate beams for receiving the movable shuttle frame and fixing the position of the movable shuttle frame relative to the glass sheet heating and forming system to locate and prevent movement of the movable shuttle frame in a first direction with respect to the glass sheet heating and forming system, but allow movement of the movable shuttle frame in a second direction with respect to the glass sheet heating and forming system as the movable shuttle frame and mold are positioned for processing the glass sheet in multiple locations within the glass sheet heating and forming system.

2. The mold shuttle positioning system as in claim 1 including at least one alignment wheel assembly mounted to support each one of the elongate beams as the shuttle frame is moved to position the mold at one of multiple desired locations, each alignment wheel assembly including an alignment wheel for vertically aligning the respective elongate beam as it is positioned in a generally horizontal direction; and
    an alignment guide mounted on at least one of the alignment wheel assemblies associated with only one of the elongate beams for locating and preventing movement of the movable shuttle frame in a first horizontal direction with respect to the glass sheet heating and forming system, but allow movement of the movable shuttle frame in a second horizontal direction with respect to the glass sheet heating and forming system as the movable shuttle frame and mold are positioned for processing the glass sheet in multiple locations within the glass sheet heating and forming system.

3. The mold shuttle positioning system as in claim 2 wherein each of the alignment guides includes a pair of rollers, each mounted for rotation about a generally vertical axis and spaced apart from each other on opposite sides of the elongate beam at a distance approximately equal to the width of the elongate beam, such that the pair of rollers contact and position the elongate beam as it is moved therebetween.

4. The mold shuttle positioning system as in claim 1 wherein each of the at least one shuttle guide includes a pair of rollers, each mounted for rotation about a generally vertical axis and spaced apart from each other on opposite sides of the elongate beam at a distance approximately equal to the width of the elongate beam, such that the pair of rollers contact and position the elongate beam as it is moved therebetween.

5. The mold shuttle positioning system as in claim 1 wherein each of the mold guides includes an alignment key which is fixed to and projects outwardly from a plane of the contacting support surface of one of the elongate beams, and a complementary-shaped key receiver which is fixed to the mold support frame and recessed inward from a plane of a surface of the mold support frame such that the alignment key engages and is received within the complementary-shaped key receiver as the mold support frame is mounted on the movable shuttle frame to prevent movement of the mold support frame with respect to the movable shuttle frame in at least one direction.

6. The mold shuttle positioning system as in claim 1 wherein each of the mold guides includes an alignment key which is fixed to and projects outwardly from a plane of a surface of the mold support frame, and a complementary-shaped key receiver which is fixed to the support surface of one of the elongate beams and recessed inward from a plane of the elongate beam such that the alignment key engages and is received within the complementary-shaped key receiver as the mold support frame is mounted on the movable shuttle frame to prevent movement of the mold support frame with respect to the movable shuttle frame in at least one direction.

7. The mold shuttle positioning system as in claim 1 wherein the elongate beams are water-cooled.

8. The mold shuttle positioning system as in claim 1 wherein the surface of the mold is a downwardly facing full surface.

9. The mold shuttle positioning system as in claim 1 wherein the surface of the mold has curvature in a first direction and straight line elements in a second direction transverse to the first direction for forming the glass sheet with curvature in the first direction while maintaining straight line elements in the second direction.

10. The mold shuttle positioning system as in claim 1 wherein the surface of the mold is a downwardly facing surface, and the mold includes a vacuum chamber and a set of openings that extend from the downwardly facing surface to the vacuum chamber, and the mold support frame includes a mold conduit operably connected at a first location to the vacuum chamber and including an opening at a second location defining a first coupling port, the mold shuttle positioning system further including:
- a vacuum source mounted on the movable shuttle frame near an end of one of the elongate beams opposite the end including the support surface for the mold support frame; and
- a shuttle conduit operably connected at a first location to the vacuum source and including an opening at a second location defining a second coupling port; and
- a connector for releasably connecting the first coupling port to the second coupling port to provide communication of a vacuum from the vacuum source through the shuttle conduit and through the mold conduit to the vacuum chamber for selectively drawing a vacuum at the downwardly facing surface of the mold.

11. The mold shuttle positioning system as in claim 1 wherein the surface of the mold comprises a full downwardly facing surface having curvature in a first direction and straight line elements in a second direction transverse to the first direction for forming the glass sheet with curvature in the first direction while maintaining straight line elements in the second direction.

12. The mold shuttle positioning system as in claim 10 wherein the vacuum source includes at least one vacuum generator.

13. A three stage forming station for forming a hot glass sheet with compound curvature, the three stage forming station comprising the mold shuttle positioning system as in claim 1, wherein the mold is a first upper mold and the surface of the mold is a downwardly facing surface that has curvature in a first direction and straight line elements in a second direction transverse to the first direction for initially forming the glass sheet with curvature in the first direction while maintaining straight line elements in the second direction, and wherein the three stage forming station further comprises:
- an upwardly facing lower mold, that has curvature at least in the first direction and permits glass sheet curvature in the second direction, for receiving the glass sheet from the first upper mold so the glass sheet is able to sag under gravity along the second direction to have some curvature in the second direction as well as curvature in the first direction; and
- a downwardly facing second upper mold, that has compound curvature and is complementary to the upwardly facing lower mold, for cooperating with the upwardly facing lower mold to press form the glass sheet with compound curvature corresponding to the shapes of the upwardly facing lower mold and the downwardly facing second upper mold.

14. The three stage forming station of claim 13 further comprising:
- a housing having a heated chamber;
- a conveyor embodied by a roll conveyor for conveying the glass sheet within the heated chamber of the housing along a horizontal plane of conveyance;
- the movable shuttle frame being movable laterally to selectively position the first upper mold within the heated chamber between a pickup position above the roll conveyor and a delivery position spaced laterally from the pickup position;
- a gas lift jet array located below the horizontal plane of conveyance to supply upwardly directed gas jets for lifting the glass sheet upwardly from the roll conveyor to the first upper mold when located in its pickup position to initially form and support the glass sheet against the downwardly facing surface of the first upper mold;
- the downwardly facing second upper mold being spaced laterally within the heated chamber from the pickup position of the first upper mold and being movable vertically between an upper position located above an elevation of the horizontal plane of conveyance and a lower position closer to the elevation of the horizontal plane of conveyance, and the downwardly facing second upper mold having a downwardly facing surface of a downwardly convex shape that defines its compound curvature;
- a first vacuum source on the movable shuttle frame;
- a second vacuum source for selectively drawing a vacuum at the downwardly facing surface of the downwardly facing second upper mold;
- the upwardly facing lower mold being located within the heated chamber below the downwardly facing second upper mold and also configured to be positioned below the first upper mold after movement thereof to its delivery position with the glass sheet supported thereon by vacuum drawn by the first vacuum source whereupon the vacuum is terminatable to release the glass sheet onto the upwardly facing lower mold and the first upper mold is movable back to its pickup position;
- the downwardly facing second upper mold then being movable downwardly from its upper position to its lower position to cooperate with the upwardly facing lower mold to press form the glass sheet with curvature in transverse directions, and the downwardly facing second upper mold is subsequently movable upwardly to its upper position with the press formed glass sheet supported on the downwardly facing second upper mold by vacuum drawn at its downwardly facing surface by the second vacuum source;
- a delivery mold that is movable to below the press formed glass sheet on the downwardly facing second upper mold in its upper position whereupon the vacuum from the second vacuum source is terminatable to release the glass sheet from the downwardly facing second upper mold onto the delivery mold which is then moveable for delivery of the press formed glass sheet; and
- a controller configured to operate the roll conveyor, the first upper mold, the gas lift jet array, the downwardly facing second upper mold, the first vacuum source on the movable shuttle frame, the second vacuum source for the downwardly facing second upper mold, the upwardly facing lower mold, and the delivery mold to perform the forming of the glass sheet and its delivery.

15. The three stage forming station of claim 14 wherein the first vacuum source is configured to be operated by the controller to provide a vacuum to the downwardly facing surface of the first upper mold to cooperate with the gas lift jet array in lifting the glass sheet from the roll conveyor into contact with the downwardly facing surface of the first upper mold for initial forming and support of the glass sheet.

16. The three stage forming station of claim 15 wherein, after the glass sheet is moved upwardly and contacts the downwardly facing surface of the first upper mold, the controller is configured to terminate the operation of the gas lift jet array while continuing to operate the first vacuum source to provide the vacuum that is then the sole support of the glass sheet on the first upper mold.

17. The three stage forming station of claim 16 wherein the upwardly facing lower mold has a ring shape configured to support the glass sheet as it sags by gravity.

18. The three stage forming station of claim 16 further including a quench station to which the delivery mold is movable to move the formed glass sheet for quenching.

19. A three stage forming station for forming a hot glass sheet with compound curvature, the three stage forming station comprising:
 a downwardly facing first upper mold that has curvature in a first direction and straight line elements in a second direction transverse to the first direction, for initially forming the glass sheet with curvature in the first direction while maintaining straight line elements in the second direction, the downwardly facing first upper mold further having a vacuum chamber;
 a mold support frame including at least one connection surface for mounting the downwardly facing first upper mold thereon, a mold conduit operably connected at a first location to the vacuum chamber and including an opening at a second location defining a first coupling port;
 a shuttle frame including a pair of elongate beams that are generally parallel, each of the elongate beams including a support surface near one end of the elongate beam for receiving and supporting the mold support frame thereon;
 a vacuum source mounted on the shuttle frame near an end of one of the elongate beams opposite the end including the support surface;
 a shuttle conduit operably connected at a first location to the vacuum source and including an opening at a second location defining a second coupling port;
 a connector for releasably connecting the first coupling port to the second coupling port to provide communication of a vacuum from the vacuum source through the shuttle conduit and through the mold conduit to the vacuum chamber for selectively drawing a vacuum at the downwardly facing first upper mold;
 an upwardly facing lower mold, that has curvature in at least the first direction and permits glass sheet curvature in the second direction, for receiving the glass sheet from the downwardly facing first upper mold so the glass sheet is able to sag under gravity along the second direction to have some curvature in the second direction as well as curvature in the first direction; and
 a downwardly facing second upper mold, that has compound curvature and is complementary to the upwardly facing lower mold, for cooperating with the upwardly facing lower mold to press form the glass sheet with transverse curvature corresponding to the shapes of the upwardly facing lower mold and the downwardly facing second upper mold.

20. The three stage forming station of claim 19 which further includes a delivery mold for receiving the press formed glass sheet from the downwardly facing second upper mold for delivery.

21. The three stage forming station of claim 19 wherein the downwardly facing first upper mold and the downwardly facing second upper mold each have a downwardly facing surface of a downwardly convex shape.

22. The three stage forming station of claim 21 wherein the downwardly facing surface of each of the downwardly facing first upper mold and the downwardly facing second upper mold includes an associated array of vacuum holes.

23. The three stage forming station of claim 19 wherein the upwardly facing lower mold has an upwardly concave shape.

24. The three stage forming station of claim 23 wherein the upwardly facing lower mold has a ring shape that defines its upwardly concave shape and is configured to support the glass sheet as it sags by gravity.

25. The three stage forming station of claim 19 wherein the downwardly facing first upper mold and the downwardly facing second upper mold each have a downwardly facing surface of a downwardly convex shape including an associated array of vacuum holes, and the upwardly facing lower mold has a ring shape that defines an upwardly convex shape and is configured to support the glass sheet as it sags by gravity.

26. The three stage forming station of claim 19 wherein: the downwardly facing first upper mold has a downwardly convex shape with an array of vacuum holes; the upwardly facing lower mold has a ring shape of an upwardly convex shape that has curvature at least in the first direction and permits glass sheet curvature in the second direction; and the downwardly facing second upper mold has a downwardly convex shape with an array of vacuum holes.

27. The three stage forming station of claim 19 wherein the vacuum source is a vacuum generator.

28. The mold shuttle positioning system of claim 1 wherein each of the mold guides includes an alignment key which projects outwardly from a plane of the support surface of one of the elongate beams and that is received by a key receiver on the mold support frame, or a key receiver that is recessed inward from the plane of the support surface of one of the elongate beams and that receives an alignment key on the mold support frame such that each alignment key is received in a key receiver to prevent movement of the mold support frame with respect to the shuttle frame in at least one direction.

29. The mold shuttle positioning system of claim 1 wherein the at least one mold guide is configured to prevent movement of the mold support frame with respect to the movable shuttle frame in all directions parallel to a plane defined by the support surface of the one of the elongate beams as the mold support frame is supported thereon.

30. The mold shuttle positioning system of claim 1 wherein the first direction, in which the at least one other mold guide prevents movement of the mold support frame with respect to the movable shuttle frame, is parallel to the generally horizontal direction in which the movable shuttle frame is movable, and the second direction, in which the at least one other mold guide allows movement of the mold support frame with respect to the movable shuttle frame, is transverse to the generally horizontal direction.

31. The mold shuttle positioning system of claim 1 further comprising a drive system for moving the movable shuttle frame in the generally horizontal direction.

* * * * *